May 29, 1923.
L. BELL
1,456,585
HEADLIGHT LENS
Filed Feb. 13, 1920    2 Sheets-Sheet 1
FIG. I
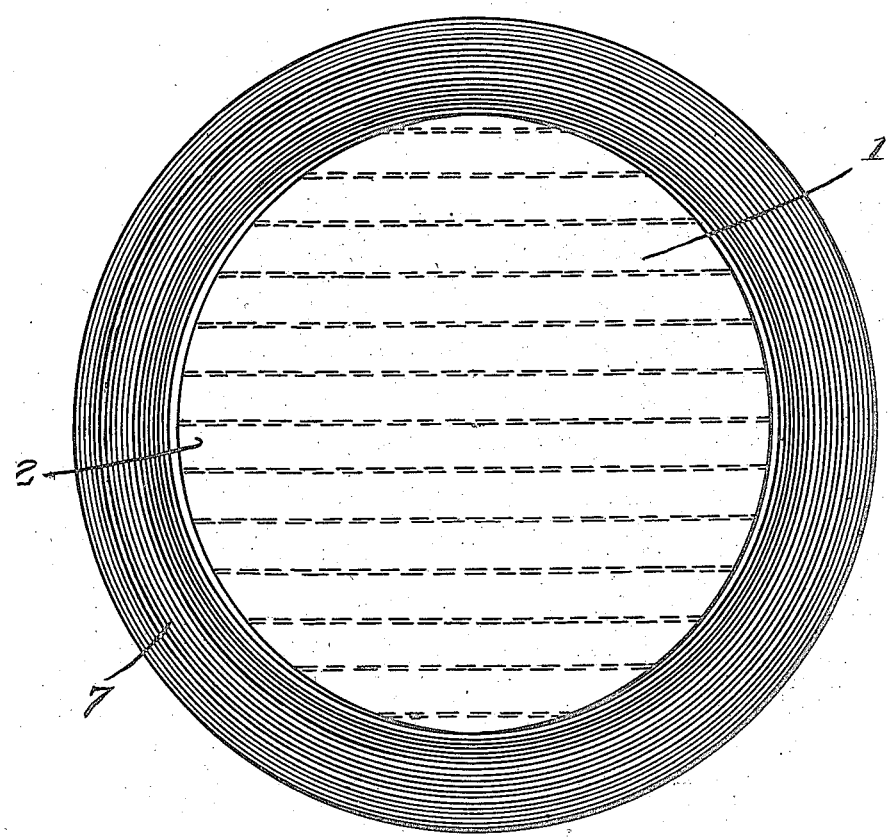
FIG. II
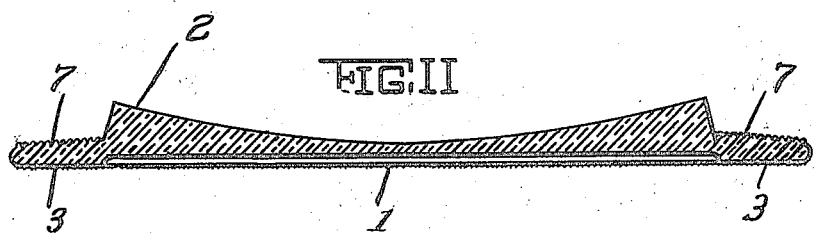
Inventor
Louis Bell
By [signature]
Attorney May 29, 1923.  L. BELL  1,456,585
HEADLIGHT LENS
Filed Feb. 13, 1920   2 Sheets-Sheet 2
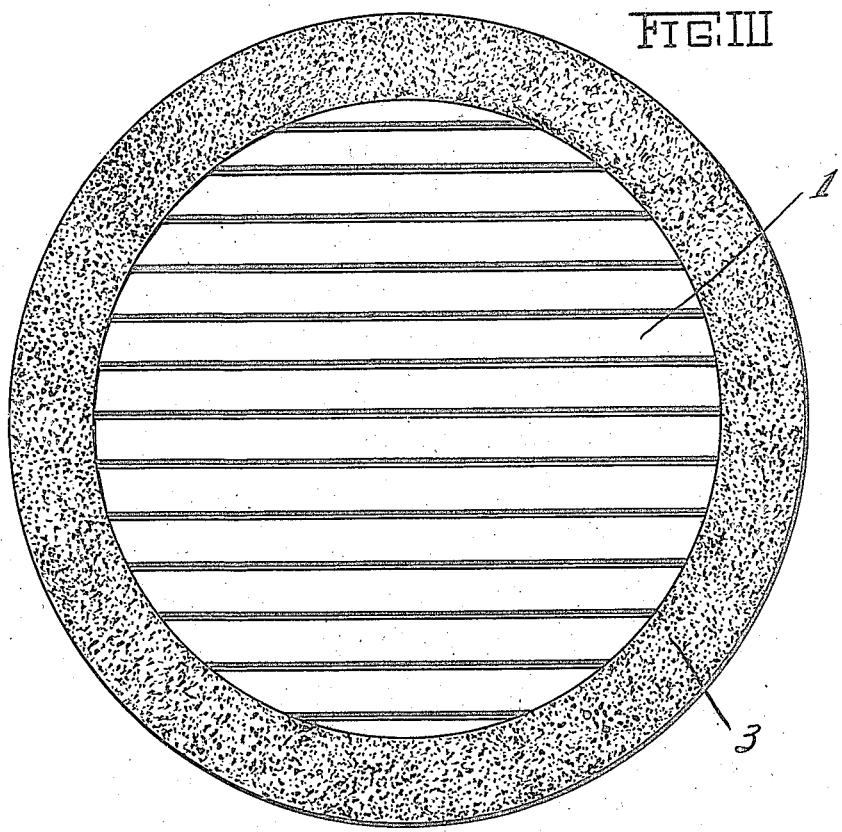
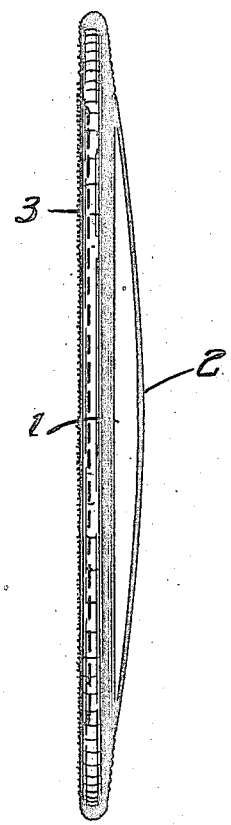
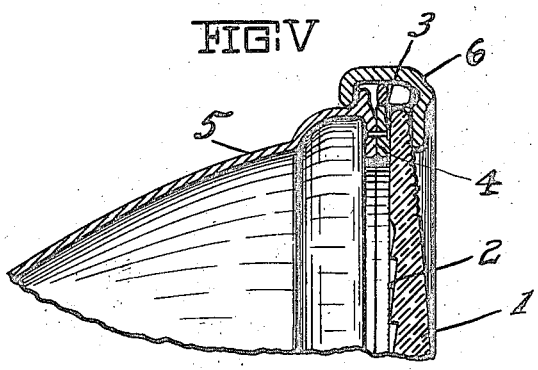
Inventor
Louis Bell
By Ellis Spear
Attorney Patented May 29, 1923.

1,456,585

UNITED STATES PATENT OFFICE.

LOUIS BELL, OF WEST NEWTON, MASSACHUSETTS, ASSIGNOR TO EDWARD N. GODING, TRUSTEE, OF NEWTON, MASSACHUSETTS.

HEADLIGHT LENS.

Application filed February 13, 1920. Serial No. 358,535.

*To all whom it may concern:*

Be it known that I, LOUIS BELL, a citizen of the United States, residing at West Newton, county of Middlesex, Commonwealth of Massachusetts, have invented certain new and useful Improvements in Headlight Lenses, of which the following is a specification.

In headlight lenses for road illumination for vehicles, designed to redistribute the beam received from the head-lamp reflector, the peripheral portion of the refracting screen is in one way or another clamped into the headlamp front usually with a clamping rim holding it in place. The clamping rims in various headlamps are of varying width and construction and with a refractive screen of the necessary diameter may overlap its rim to greater or less extent. There is therefore a marginal portion immediately within the rims which either must leave a passage of unredistributed light or be transformed in one way or another into an optically active surface.

In my previous Patent, No. 1,277,364, I have dealt with this matter to some extent and with considerable degree of success. The difficulty lies in being able to control sufficiently the marginal rays. This is due to the fact that the commercial parabolic reflector has a considerable degree of marginal error so that near the edge of the beam there is a considerable quantity of errant rays which are apt to be extremely annoying in producing so-called glare.

To overcome this and at the same time avoid certain difficulties which I will hereinafter explain, I have devised my present invention. By it I have succeeded in suppressing these errant rays and done so without encountering the mechanical difficulties involved in use of the lens with certain types of lens rims.

As illustrative of my invention I have shown a commercial lens which well illustrates the principles of my invention and in itself constitutes a successful embodiment. Throughout the specification and drawings like reference numerals are correspondingly employed, and in the drawings:

Fig. I is a front elevation of a lens in accordance with my invention.

Fig. II a horizontal central section.

Fig. III a rear elevation.

Fig. IV a side view, and

Fig. V a fragmentary detail illustrating the rim mounting of such a lens.

Referring to the drawings, I have shown the lens as comprising a central area 1 having on its rear face horizontal prisms and on its front face a cylindric distributing portion 2 best shown in Figs. III and IV. About this central portion on each side is, an annulus into which the horizontal prisms and lateral deflecting members do not extend. This portion is the marginal clamping area before referred to.

On the rear face as shown in Fig. III this portion is heavily stippled as indicated at 3 so as to give a mechanically roughened and optically diffusing surface. This surface corresponds with the rear annulus of my prior patent above referred to. In addition to its optical function of diffusing and suppressing errant rays, it has the mechanical function best illustrated in Fig. V. In this mechanical function the roughening at 3 tends to hold the lens against rotation, being pressed against the usual felt pad 4 of the headlight shell 5 by the rim 6.

This roughening or stippling however, while coarse enough to produce mechanical friction is not always sufficient to produce a complete diffusion. Therefore it is desirable to supplement it with further light scattering.

It must be borne in mind, however, that inasmuch as many of the fronts or rims of headlights are put in place by rotating movement that the same stippling applied in the treatment of the rear face of the lens for frictional purposes can not be applied to the front face without the likelihood of the rim destroying the mechanical grip of the rear face 3 on the felt pad 4 and rotating the lens.

In the headlight lenses having a central portion provided with refracting elements, such central portion is thicker than is necessary or desirable in the marginal portion by which the lens is clamped into place. To strengthen the annular rim and facilitate its manufacture, this rim is usually somewhat thicker toward the center than at the extreme periphery. The effect of this thickening is to constitute an annular prism which tends to concentrate the light passing through it and hence to produce a cone of undepressed and unmodified illumination ahead of the lamp. It is therefore desirable in producing an optically active surface on this annulus so to constitute it as to produce sharp radial dispersion of the emergent rays so as to avoid any concentration of light due to the prismatic annular form just mentioned.

I therefore form the front of the annulus as shown in Fig. I with circumferential flutings, groovings, or other annular refractive surfaces adapted to produce dispersion, of the type often known among optical manufacturers as "reecing" and applied to opaque surfaces to diminish reflection.

The face 7 is formed with a slight inclination or taper towards the edge to take up any inequality in the edge of the headlight rim. The headlight rim therefore comes up against it with a firm pressure but on account of the circumferential disposition of the diffusing faces the headlight rims may be freely turned without destroying the frictional grip of the stippled rear face on the felt pad 4. The treated annulus 7 therefore permits an important optical supplement of the stippling 3 of the rear face and like the treatment of that face has both an optical and a mechanical function, especially in its combination with the rear face and the elements of the lamp rim.

In this manner I am able to form headlight lenses with an ample marginal annulus optically and mechanically sufficient to take care of the widest range of lamp rims and without the slightest danger of marginal glare. Furthermore, these lenses may be put in place and the front rim 6 locked by any degree of rotative movement necessary even though several turns might be required under pressure to effect the locking of the rim. The general optical system of such a lens may be of various types and designs.

Various modifications may also be made in the details of the form and extent of the marginal annulus and in the combination between the front treatment and the roughened rear surface. All such modifications may be made in accordance with my invention and without departing from its spirit if within the limits of the appended claims.

What I therefore claim and desire to secure by Letters Patent is:

1. In combination with a headlight having an outwardly faced lens bearing and an inwardly faced lens clamping front, a lens having refracting elements of predetermined function with reference to a definite vertical axis disposed centrally thereof, and an annular clamping margin surrounding said elements, the rear face of said margin being roughened for non-slipping contact with the outwardly disposed bearing of said headlight and the front face of said annulus having circumferential diffusing elements entirely about its margin and extending within the grasp of the inwardly disposed bearing of the clamping front.

2. A headlight lens of the class described having refracting elements of predetermined function with reference to a vertical axis and arranged centrally thereof, and an annular clamping margin surrounding said elements, the rear face of said margin being roughened to prevent rotation, the front face of said margin having concentric circumferential groovings disposed in centering relation to said lens.

3. In combination with a headlight having a forwardly disposed lens clamping shoulder and a rearwardly bearing lens clamping front, a lens having refracting elements of predetermined function with reference to a vertical axis centrally thereof, and an annular clamping margin surrounding said elements, the rear face of said annular margin having a friction surface adapted to have a non-slip relation to the forwardly disposed shoulder of the lamp, and the front face of said annulus having annular extending circular ridges formed thereon and disposed in nonresisting relation to rotative movement of the lens clamping front.

In testimony whereof I affix my signature in presence of two witnesses:

LOUIS BELL.

Witnesses:
 ESTHER A. PRENTISS.
 MARION F. WEISS.